United States Patent [19]

Kato et al.

[11] Patent Number: 4,624,607
[45] Date of Patent: Nov. 25, 1986

[54] COMPUTED NUMERICAL CONTROL DRILLING MACHINE

[75] Inventors: Kenji Kato; Masao Hosaka, both of Tokyo, Japan

[73] Assignee: Janome Sewing Machine Co., Ltd., Tokyo, Japan

[21] Appl. No.: 682,266

[22] Filed: Dec. 17, 1984

Related U.S. Application Data

[63] Continuation of Ser. No. 370,122, Apr. 20, 1982, abandoned.

[30] Foreign Application Priority Data

May 6, 1981 [JP] Japan .................. 56-67839

[51] Int. Cl.⁴ ............................................ B23B 35/00
[52] U.S. Cl. .................................. 408/1 R; 364/474; 408/3; 408/17

[58] Field of Search ............ 408/1 R, 3, 17, 13; 409/80; 364/474; 318/574, 492, 603, 617

[56] References Cited

U.S. PATENT DOCUMENTS

| | | | |
|---|---|---|---|
| 3,854,837 | 12/1974 | Kreithen et al. | 408/17 |
| 4,123,188 | 10/1978 | Deremo et al. | 408/17 |
| 4,421,441 | 12/1983 | Hirose | 408/17 |
| 4,473,329 | 9/1984 | Aoshima et al. | 408/17 X |

Primary Examiner—Z. R. Bilinsky
Attorney, Agent, or Firm—Michael J. Striker

[57] ABSTRACT

In a computer controlled drilling process for emitting holes of a very small diameter, a control device controls a step motor in response to open loop instructions from the computer.

2 Claims, 8 Drawing Figures

FIG_1
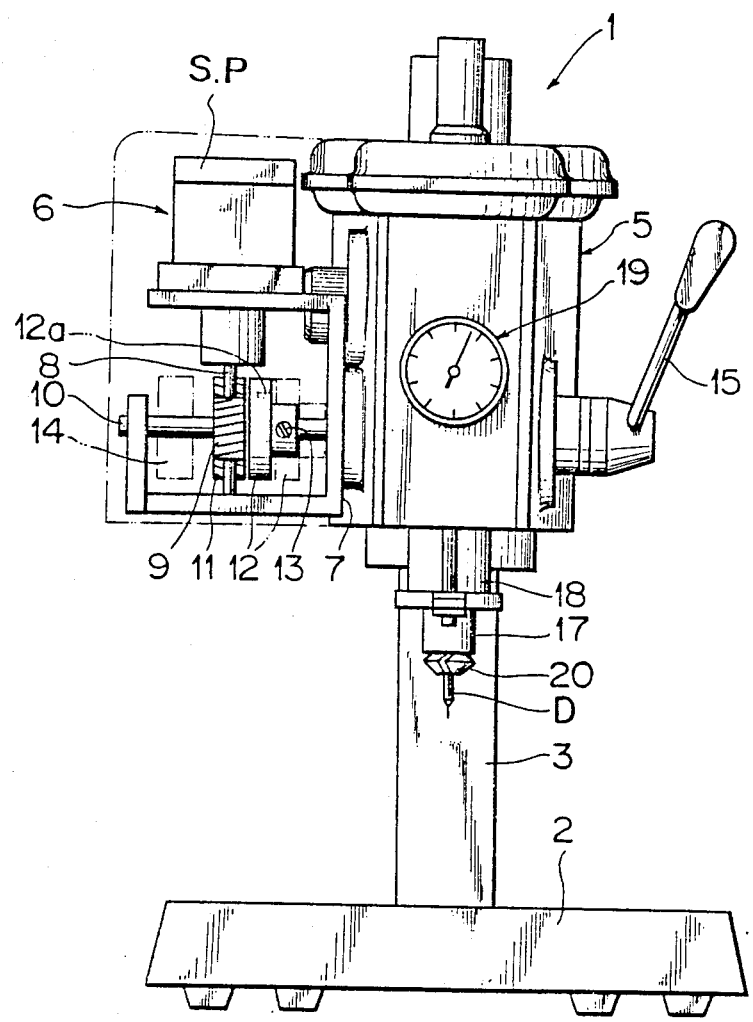

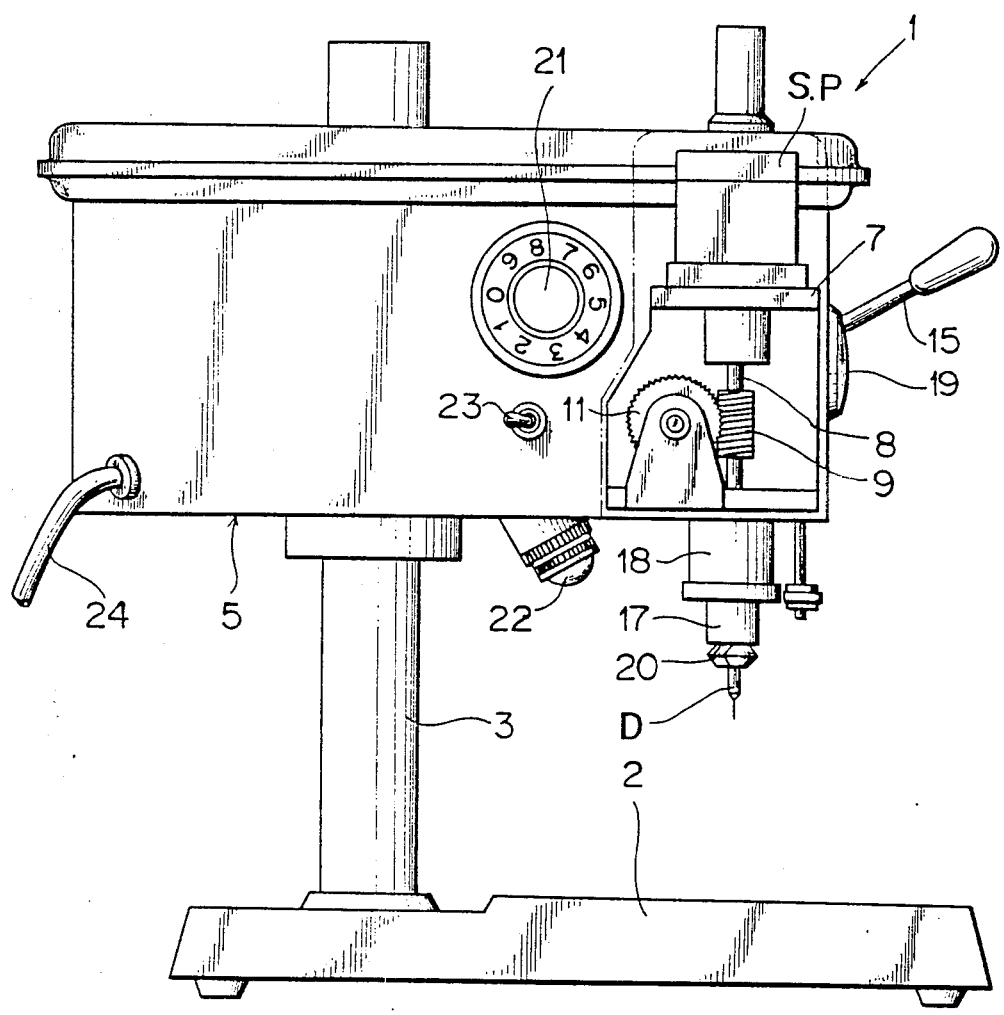
FIG_2

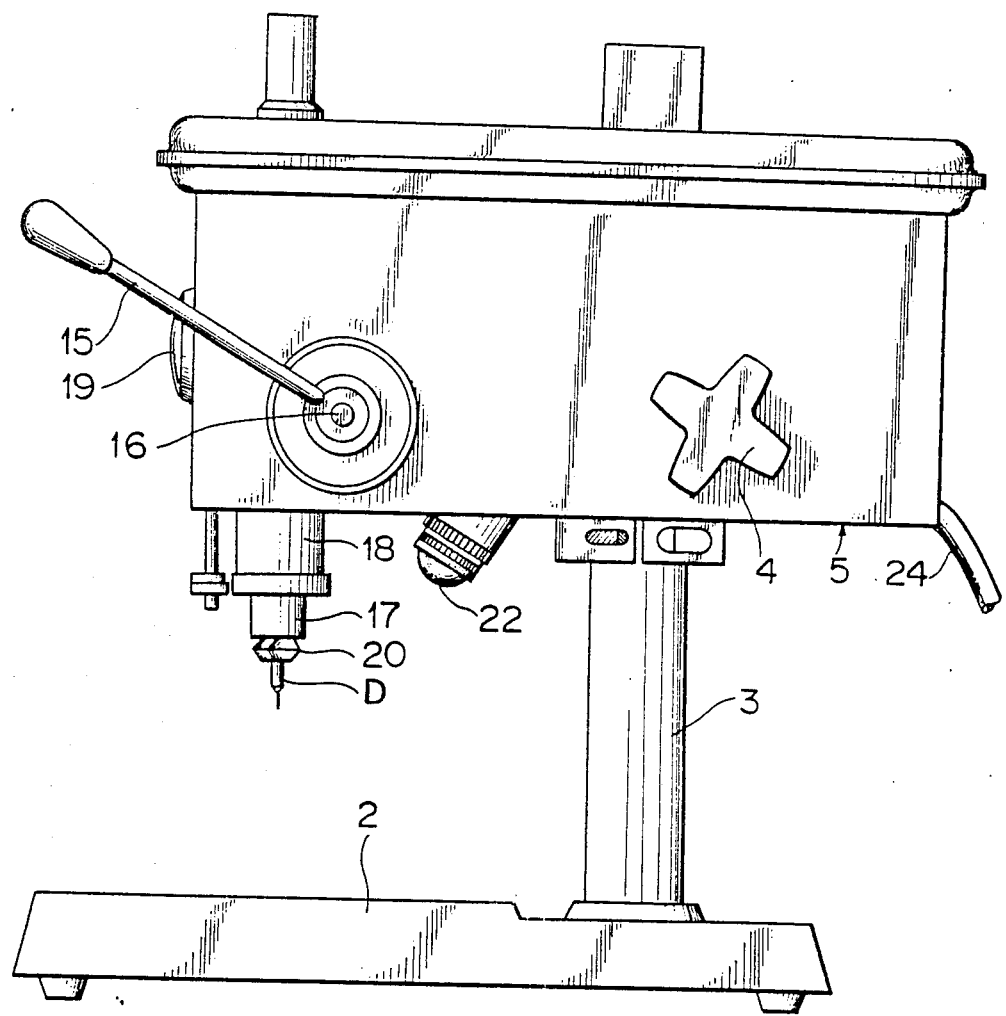

FIG_4
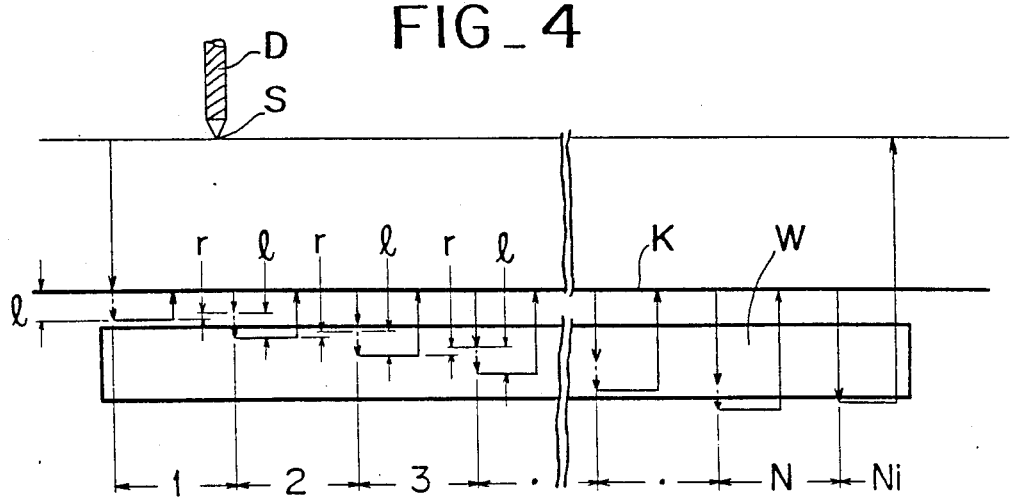
FIG_5
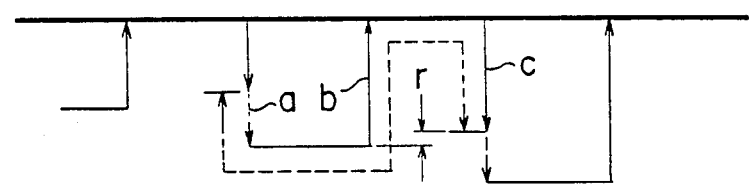
FIG_6
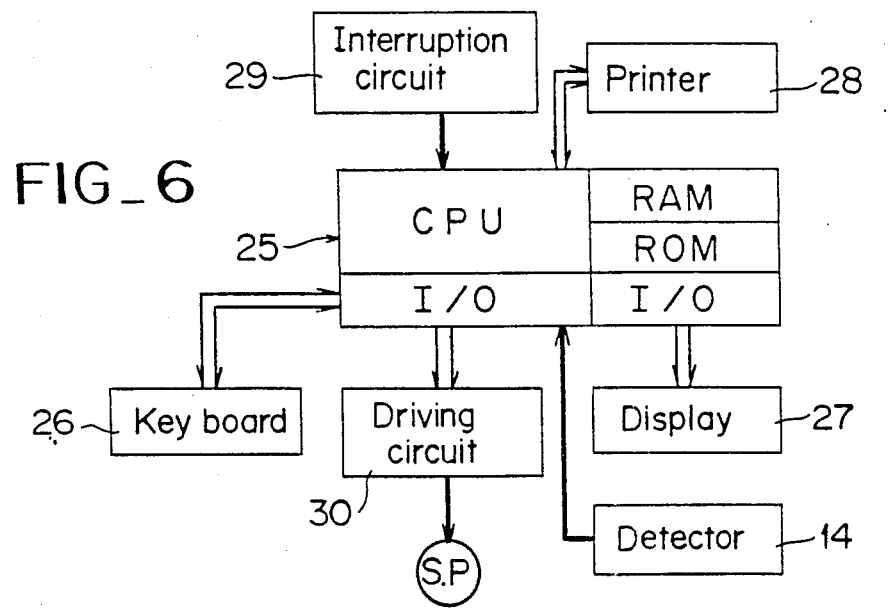

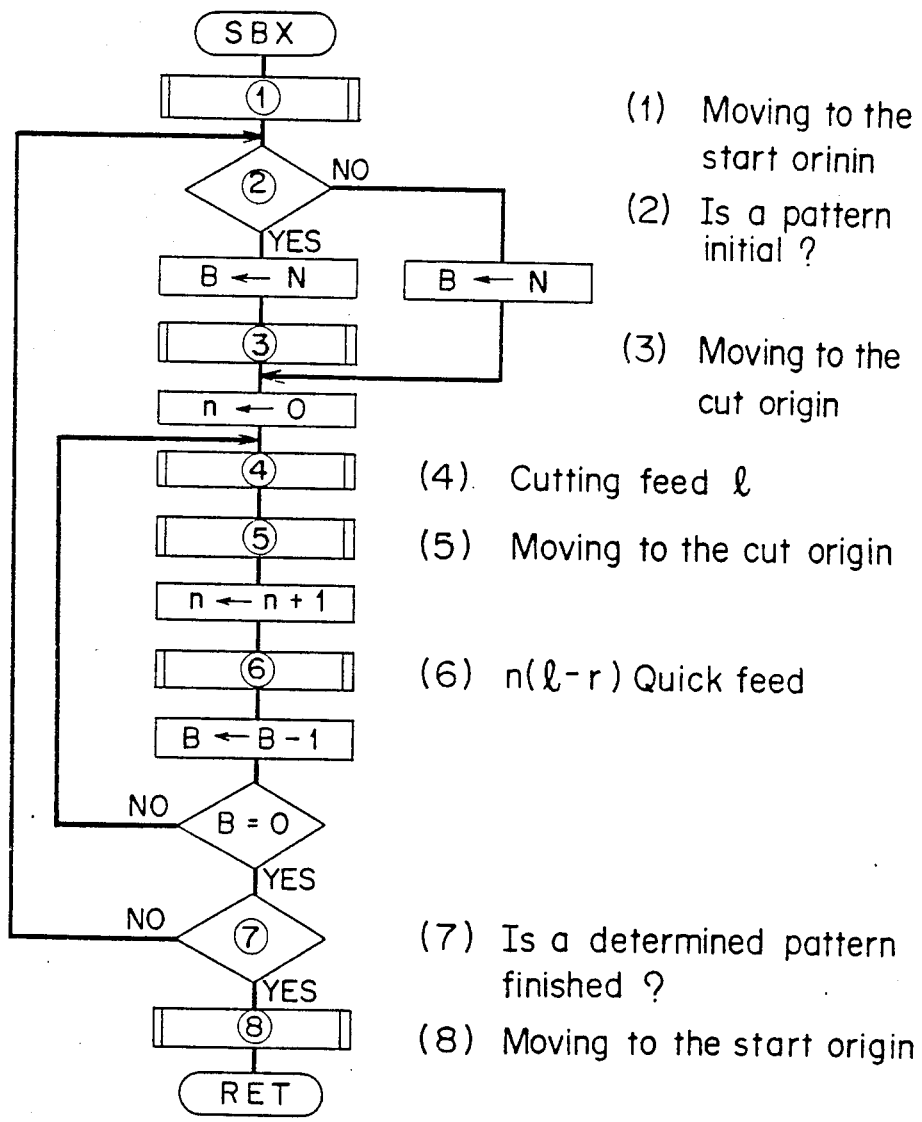
FIG_7
(1) Moving to the start orinin
(2) Is a pattern initial ?
(3) Moving to the cut origin
(4) Cutting feed $\ell$
(5) Moving to the cut origin
(6) $n(\ell-r)$ Quick feed
(7) Is a determined pattern finished ?
(8) Moving to the start origin

FIG_8

| ① ③ ②        | ④ — | ⑤ — | ⑥ O      | ⑦ O           | ⑧ —   |
|--------------|-----|-----|----------|---------------|-------|
| 1            | r   | ℓ   | ℓ−r      | ℓ             | ℓ     |
| 2            | r   | ℓ   | 2(ℓ−r)   | (ℓ−r)+ℓ       | ℓ−r   |
| 3            | r   | ℓ   | 3(ℓ−r)   | 2(ℓ−r)+ℓ      | ℓ−r   |
| 4            | r   | ℓ   | 4(ℓ−r)   | 3(ℓ−r)+ℓ      | ℓ−r   |
| ⋮            | ⋮   | ⋮   | ⋮        | ⋮             | ⋮     |
| N            | r   | ℓ   | N(ℓ−r)   | (N−1)(ℓ−r)+ℓ  | ℓ−r   |

(1) Items  (2) Initial conditions (3) Step order $N_i$  (4) Clearance $r$ (5) Cutting feed amount $\ell$ (6) Quick feed sizing amount $N_i(\ell - r)$ (7) Available depth $(N_i - 1)(\ell - r) + \ell$ (8) Net amount of cutting feed

COMPUTED NUMERICAL CONTROL DRILLING MACHINE

This is a continuation of application Ser. No. 370,122, filed Apr. 20, 1982, now abandoned.

BACKGROUND OF THE INVENTION

The invention relates to computed numerical control of a drilling machine by which drilling of very minute diameter may be performed.

This kind of the drilling machines are mainly used for making very small holes in, e.g., a precision-finished metal die for escaping the air, being about 0.1 mm diameter, in which the air could enter such small hole but a molten substance could not go into the hole, or a special injection nozzle of combustion, connecting point of glass fiber to glass fiber for light communication, being 0.125 mm diameter for required 0.126 mm diameter, surgical operational device, and others.

There are conventional ways of drilling processes of this kind, which are roughly divided into (1) a process performed in dependence upon a step feed mechanism utilizing a closed loop control system, which is housed in a precision sizing device, and (2) a process performed in dependence upon a step feed mechanism utilizing an open loop control system.

In the process (1), if a required drilling diameter were less than 0.5 mm, the drill would be easily broken and it is extremely difficult to make perforation of around 0.1 mm diameter.

In known embodiments of the step feed mechanisms using the open loop control system (2), one of them uses an air timer to open and close a switch pneumatically. Another utilizes a rotary cam to open and close a switch by a cam. The other employs a step motor. However under the present circumstances excepting the step feed mechanism, they would be unsuitable for making the small perforation of minute diameter.

The control of the drill process in general comprises repetition of the process of forming a cut origin on the surface of an object to be processed, moving down the drill from the cut origin by a certain feed amount, returning it to the cut origin, farther moving it down and again returning to the origin.

An explanation will be made to the step feed mechanism using the step motor now reduced to practice. A control device thereof is based on a digital control using IC and transistor. However it is difficult to provide complicated control of the feeding amount by fine control of the step motor. For performing the drilling of the small diameter, said repetition is carried out between the cut origin and the processing point to make the processing deeper at the low processing speed. If the hole diameter were required less than 0.1 mm, the drilling efficiency would be extremely low. In the actual requirements, the feed speed could not be reduced less than a certain limit. Therefore the drilling process for holes of less than 0.3 mm diameter is regarded as impossible.

SUMMARY OF THE INVENTION

An object of the invention is to provide a computed numerical control of the drilling machine wherein processing conditions are programmingly input to a control device which utilizes a micro-computer in a central processing unit thereof, and a step motor is controlled with the open loop by means of the control device, thereby enabling to operate the drilling process for holes of very small diameter which has been impossible in the prior art.

BRIEF DESCRIPTION OF THE DRAWINGS

FIG. 1 shows a front view of a drilling machine,
FIG. 2 shows a left side view of the machine of FIG. 1,
FIG. 3 shows a right side view of the same,
FIG. 4 is a time diagram for explaining feed control of the same,
FIG. 5 is a diagram of a one part of FIG. 4,
FIG. 6 is a block diagram of a numerical control device,
FIG. 7 is a general flow chart of a feed control program,
FIG. 8 shows each of the processing amounts in the respective processing steps.

DETAILED DESCRIPTION OF THE INVENTION

The present invention will be explained in reference to embodiments thereof. The drilling machine 1 is composed of a base 2, a column 3, a main body 5 which can be vertically adjusted with respect to the column 3 by loosening a knob 4, and a mechanism 6 mounted on the main body 2 for effecting step feed. The mechanism 6 has a support frame 7 on which a step motor (S.P.) is disposed and the step motor has an output shaft rotating together with a shaft 8 which is secured to a worm gear 9 gearing a worm wheel 11 mounted on a shaft 10. The worm wheel 11 is rotatably supported but is restrained in the thrusting direction with respect to the shaft 10.

A clutch plate 12 is movable along the shaft 10 by loosening a setting screw 13. At a position shown with solid line in FIG. 1, a pin 12a engages a hole (not shown) formed in the worm wheel 11 to transmit rotation of the worm wheel 11 to the shaft 10 via the clutch plate 12. At a position shown with two dotted line in the same, the pin 12a disengages from the hole so that the shaft 10 may freely rotate with respect to the worm wheel 11.

A detector 14 is for limiting the rotation amount of the shaft 10. A handle lever 15 rotates a shaft 16 which is operatively connected to the shaft 10 of the mechanism 6. When the clutch plate 12 positions at the two dotted line, a quill 18 rotatably holding a spindle 17 may be vertically moved by manual operation with respect to the main body 5 without rotating the worm wheel 11. The vertical position of the quill 18 is indicated on a depth gauge 19. A spindle 17 is detachably attached with a drill (D) via a collet 20. The spindle 17 is adjusted in rotation speed by a dial 21. The numeral 22 is a lamp, 23 is a power source switch, and 24 is a power supply cable.

Feed control of the invention will be explained in reference to FIG. 4 of the drawings. Assume that "l" denotes the amount of cutting feed at low speed, "r" is clearance for avoiding the drill from collision against an object to be processed, "N" is the number of repetitions of the drilling step, and "Ni" is stepping order. The feed control of the drill is carried out as shown in the diagram.

The computed numerical control of the drill machine in accordance with the present invention comprises a preparatory step during which the drill (D) is moved down at quick feed from the start origin (S) to the cut position or origin (K) set about 0.2 to 1.0 mm above the surface of the object (W), then the drill (D) is farther moved down at slow feed by a length "l" leaving a clearance "r" for avoiding the drill from collision against the object (W), and then the drill is returned to the cut origin (K) at the quick feed; a first working step at which is moved down the drill at the quick feed from the cut origin (K) by the length "l" less the clearance "r" defined in the preceding preparatory step, and then the drill is further moved down at the slow feed to penetrate into the object by "l", and then is returned to the cut origin (K) at the quick feed; a second working step at which the drill is moved down at the quick feed from the cut origin (K) into the hole made in the preceding first step but leaving the clearance "r" with the bottom of the hole, and then moving the drill down at the slow feed into the object (W) by "l" with a clearance "r", and thereafter returning it to the cut origin (K) at the quick feed; further steps are made by repeating the working steps in the same manner as mentioned above; and the last step returns the drill to the start position (S) at the quick feed, when the pre-set stepping number (Ni) of working steps is completed.

In FIG. 5, (a) shows the drill advance at the low cutting feed of (Ni) steps, (b) shows a step of returning the drill to the cut origin at the quick feed, and (c) shows a step of moving the drill down at the quick feed, and both arrows of the dotted line indicate the angle of one working step. The clearance "r" is established for preventing the drill from engaging the object exceedingly quick feed in the processed hole after the fast feed step and before the actual cutting begins.

The control of this invention is characterized in that each of the steps shown in FIG. 4 is made in the afore-described order and in the fact that when the length of the quick feed of the downward movement during the Ni step is set as a standard of the cut origin, the program is set to be Ni(l−r). As a result, the net length of the cutting feed after the second step is obtained a difference between the cutting feed "l" and the clearance "r", so that the net length of the minute cutting feed may be obtained.

Each of the amounts in Ni steps as shown below is obtained by the feed amount Ni(l−r) in Ni steps while maintaining the controlling order in each of the steps.

Available depth of the hole=(the quick feed length in the preceding step)+(the cutting feed length)=-(Ni−1)(l−r)+l The net cutting feed length=(the available depth)−(the available depth of the preceding step)=(Ni−1)(l−r)+l−[(Ni−2)(l−r)+l]=l−r Herein, with respect to the net amount of the cutting feed of the first step, the preceding step is not defined, but since the cut origin is positioned on the assumption that the cut origin corresponds to the available depth of the preceding step it is equivalent to the available depth "l" of the first step. FIG. 8 shows each of the cutting amounts in the respective steps.

FIG. 4 shows an example of one pattern comprising the repeating steps of the feed control. In dependence upon the other embodiment of the invention, the drilling process may be provided by a plurality of patterns. For example, the processing may be carried out by the pattern comprising the steps of repeating the net amount of the small cutting feed, at the initial period of cutting, and by the pattern of the large feed at the middle period and by the pattern of the small feed at the last period. The cutting feed speed may be varied per each of the patterns.

The above mentioned feed is controlled by program which has been in advance set in the micro-computer 25. In FIG. 6, a key board 26 is for the programming input of the processing conditions such as the clearance "r", the cutting feed amount "l" and the repeating step number "N". A display 27 and a printer 28 are output devices for indicating and confirming the contents of the program input. An interruption circuit 29 is provided for automatically or instantly stopping when abnormal conditions are detected the operation. A drive circuit 30 is for driving the step motor (S.P.). A detector 14 is mounted on the shaft 10 of the mechanism in order to control the rotation range of the shaft 10.

FIG. 7 shows the general flow chart of a subroutine program for the feed control In accordance with the method of this invention, the value of the clearance "r" has been entered in advance in the computer, and the program corresponding to the flow chart in FIG. 7 has been prepared. It is sufficient to programmingly input the processing conditions of the cutting feed amount "l" and others as mentioned above. Therefore, if the conditions have been set as "r=0.1 mm" and are set "l=0.11 mm", it is easily posible to obtain the net cutting amount "0.01 mm" to be obtained from "l−r" after the second step. Since the first net cutting amount is "l=0.11 mm", "4" is sufficient with respect to the clearance between the cut origin (K) and the processed surface.

Another reference will be made to the fundamental faculty of the relative feed control to be set in the drilling machine where the invention has been embodied.

The net amount of the cutting speed: 0.01 mm interval up to 0.01 to 99.99 mm

The repeating step number and the pattern number: (1 to 99 steps)×3 patterns

The cut origin: range between 0.11 mm of the start origin and 99.99 mm

The cutting feed speed: 0.2 mm/s to 1.6 mm/s (5 steps)

The quick feed speed: 4 mm/s

For carrying out the process of this invention, the material (W) to be treated is set on the base 2 of the drilling machine 1, and the drill (D) is attached to the spindle 17 via the collet 20. Subsequently, the distance between the start origin (S) and the surface of said material is measured in order to determine the cut origin (K). With respect to the predetermined clearance "r", the processing conditions such as the cutting feed amount "l", the number N of repeated steps and others are programmingly input in accordance with the diameter of the drill and others. The rotational speed of the spindle 17 is selected with the dial 21, and the drilling process is started.

Referring to FIGS. 4 and 7, the subroutine program (SBX) starts, the drill (D) moves to the start origin (S) for discriminating the pattern order, and the stepping number NH of repetition is stored in a B register, and subsequently the drill is moved to the cut origin (K) to set the counter "n" at 0, and the repeated working steps are performed.

At the first step, the cutting is carried out from the cut origin (K) by "l" at the slow feed, and the drill (D) is returned to the cut origin (K) at the quick feed. Since n is 1 in this step, the drill is moved down by "n(l−1)" i.e. "l−r" at the quick feed from the cut origin (K), and the number of the B register is counted down by 1. Thus, the first step if finished. Subsequently, the repeating control is operated till the N step where B is 0, and the discrimination is made whether or not the required pattern number is completed. If not, the program from "Is the pattern initial ?" is excercised until the determined pattern number is finished, and the drill (D) is returned to the start origin (S) at the quick feed. Thus, the drilling process is finished.

In the drilling operation by the actual machine where the feed control has been performed according to the process of the invention the drill of 0.1 mm diameter could penetrate the phosphrous bronze plate of 0.5 mm in thickness. This achievement was impossible in the prior art.

In the conventional drilling process by the repeating steps the switching of the feed speed is not made within each of the steps. The feed speed between the cut origin and the processing point, and the feed speed at returning to the cut origin from the processing point are always slow for the cutting process. Therefore, the drilling of less than 0.3 mm diameter was extremely difficult in view of the processing efficiency.

Depending upon the present invention, it is possible to switch the feed speed of the drill to the quick feed or to the slow feed within each of the steps by means of the micro-computer control. As a result, the cutting feed could be set at the low speed suitable to the drilling process of the minute diameter, while maintaining the processing efficiency.

According to the present invention, the processing conditions are programmingly intput to the control device which uses the micro-computer in the central controlling portion thereof, and the step motor is controlled with the open loop by means of the control device in order to control the feed of the drilling machine, by which the conventionally impossible drilling process may be stably provided with prominent results.

What is claimed is:

1. A method of computed numerical control of a drilling machine having a quill adapted for mounting a drill bit of a diameter in the order of 0.1 mm on a free end thereof and being movable toward and away from a work piece to be drilled, said quill being driven by a step motor which is operable at two pulse rates, one being a slower pulse rate for drilling and the other being a faster pulse rate for advancing to the work piece, said control method comprising a preparation step of advancing the quill with the drill bit at the faster pulse rate from an initial position to a predetermined reference position at a distance $K = l + r$ above the surface w of the work piece where l is a predetermined first drilling depth and r is a safety clearance; and a cycle of sequential working steps N of advancing, in the first working step $N=1$, the quill with the drill bit at the slower rate to advance the drill bit said predetermined first drilling depth l from the reference position to the work piece; retreating the quill with the drill bit at the faster pulse rate to retrieve the drill bit to the reference position after the drill bit has advanced the first drilling depth l; advancing the quill with the drill bit at the faster pulse rate until the drill bit is advanced a predetermined portion $(l-r)$ of the first drilling depth from the reference position, where the drill bit is spaced apart about a clearance 2r from the surface w; further advancing, in the second working step $N=2$, the quill with the drill bit at the slower pulse rate to a second drilling depth $(l-2r)+l$; then retreating the quill with the drill bit at the faster rate to retrieve the drill bit to the reference position after the drill has advanced the second drilling depth; said cycle of sequential working steps N being repeated with corresponding fast advances over successive drilling depths $N(l-r)$ until a hole of a final depth determined by the relationship $(N-1)(l-r)+l$ is formed in the work piece; finally retreating the quill at the faster pulse rate to retrieve the drill to the initial position after the drill bit has advanced to the final drilling depth; and said cycle of sequential working steps being performed under the control of a program stored in a computer wherein the number of N of working steps, the clearance r, the first drilling depth l and the two pulse rates are input variables.

2. A method of computed numerical control of a drilling machine having a quill adapted for mounting a drill bit on a free end thereof being movable toward and away from a work piece to be drilled, said quill being driven by a step motor which is operable at least two pulse rates, one being a slower pulse rate for drilling and the other being a faster pulse rate for advancing to the work piece, said control method comprising a preparation step of advancing the quill with the drill bit at the faster pulse rate from an initial position to a predetermined reference position above the surface of the work piece; and a sequential cycle of working steps N of advancing, in the first working step $N=1$, the quill with the drill bit at the slower rate to advance the drill bit a predetermined first drilling depth l from the reference position to the work piece; retreating the quill with the drill bit at the faster pulse rate to retrieve the drill bit to the reference position after the drill bit has advanced the first drilling depth l; advancing the quill with the drill bit at the faster pulse rate until the drill bit is advanced a predetermined portion $(l-r)$ of the first drilling depth from the reference position, where the drill bit is spaced apart about a clearance r from the terminal point of the first drilling depth; further advancing, in the second working step $N=2$, the quill with the drill bit at the slower pulse rate to a second drilling depth $(l-r)+l$ after the drill bit has traversed said clearance; then retreating the quill with the drill bit at the faster rate to retrieve the drill bit to the reference position after the drill has advanced the second drilling depth; said sequential cycle of working steps N being repeated until a hole of a final depth determined by the relationship $(N-1)(l-r)+l$ is formed in the work piece; finally retreating the quill at the faster pulse rate to retrieve the drill to the initial position after the drill bit has advanced to the final drilling depth; and said sequential cycle of working steps being performed under the control of a program stored in a computer wherein the number N of working steps, the clearance r, the first drilling depth l and the two pulse rates are input variables.

* * * * *